US011123252B2

(12) United States Patent
Xue et al.

(10) Patent No.: US 11,123,252 B2
(45) Date of Patent: Sep. 21, 2021

(54) FLEXIBLE SUIT AND FLEXIBLE SYSTEM FOR REHABILITATION TRAINING OF HUMAN LEG

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Bangcan Xue, Beijing (CN); Yanjun Liu, Beijing (CN); Taesung Kang, Beijing (CN); Liguang Deng, Beijing (CN); Wenfeng Jin, Beijing (CN); Jian Bai, Beijing (CN); Dong Zhang, Beijing (CN); Tao Jia, Beijing (CN); Jia Meng, Beijing (CN); Hongqiang Ji, Beijing (CN); Zhehua Long, Beijing (CN); Yu Liu, Beijing (CN); Yanbin Liang, Beijing (CN); Meijuan An, Beijing (CN); Jinge Zhao, Beijing (CN); Feiwu Yuan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 239 days.

(21) Appl. No.: 16/387,633

(22) Filed: Apr. 18, 2019

(65) Prior Publication Data
US 2020/0009001 A1 Jan. 9, 2020

(30) Foreign Application Priority Data
Jul. 5, 2018 (CN) .......................... 201821060140.8

(51) Int. Cl.
*A61H 1/02* (2006.01)
*A63B 21/00* (2006.01)
(Continued)

(52) U.S. Cl.
CPC .......... *A61H 1/0237* (2013.01); *B25J 9/0006* (2013.01); *A61H 3/008* (2013.01); *A61H 2201/165* (2013.01); *A63B 21/00181* (2013.01)

(58) Field of Classification Search
CPC .................. A61H 1/0237; A61H 3/008; A61H 2201/165; A61H 1/024; A61H 1/0244;
(Continued)

(56) References Cited

U.S. PATENT DOCUMENTS 10,377,036 B2 * 8/2019 Namoun ................ B25J 9/0006
10,639,185 B2 * 5/2020 Agrawal ............. A61H 1/0292
(Continued)

FOREIGN PATENT DOCUMENTS

CN 104490568 A 4/2015

*Primary Examiner* — Andrew S Lo
(74) *Attorney, Agent, or Firm* — Dilworth & Barrese, LLP.; Michael J. Musella, Esq.

(57) ABSTRACT

The present disclosure provides a flexible suit and a flexible system for rehabilitation training of a human leg. The flexible suit includes a first hip joint motion assembly, a first knee joint motion assembly and a first ankle joint motion assembly, a first end of the first knee joint motion assembly is connected with the first hip joint motion assembly, a second end of the first knee joint motion assembly is connected with the first ankle joint motion assembly, the first hip joint motion assembly, the first knee joint motion assembly, and the first ankle joint motion assembly each includes a flexible mechanism, and at least one of a group consisting of the first hip joint motion assembly, the first knee joint motion assembly, and the first ankle joint motion assembly is configured to operate under gas drive.

20 Claims, 7 Drawing Sheets

(51) Int. Cl.
*A61H 3/00* (2006.01)
*B25J 9/00* (2006.01)

(58) Field of Classification Search
CPC .................. A61H 3/00; A61H 2205/10; A61H 2205/102; A61H 2201/1238; A61H 2205/088; A61H 2201/1652; A61H 2201/1642; A61H 2201/018; A61H 2201/5056; A61H 2201/0192; A61H 2003/007; A61H 2201/163; A61H 1/0266; A63B 21/00181; B25J 9/0006; B25J 9/0066

See application file for complete search history.

(56) References Cited

U.S. PATENT DOCUMENTS

| | | | | |
|---|---|---|---|---|
| 10,864,100 | B2* | 12/2020 | Walsh | A61F 5/0102 |
| 2009/0210093 | A1* | 8/2009 | Jacobsen | A61H 3/008 |
| | | | | 700/260 |
| 2011/0166489 | A1* | 7/2011 | Angold | A61H 1/0255 |
| | | | | 601/34 |
| 2014/0358053 | A1* | 12/2014 | Triolo | B25J 9/0006 |
| | | | | 602/16 |
| 2014/0378882 | A1* | 12/2014 | Kazerooni | A61F 5/02 |
| | | | | 602/19 |
| 2015/0321339 | A1* | 11/2015 | Asbeck | B25J 9/0006 |
| | | | | 414/7 |
| 2015/0321341 | A1* | 11/2015 | Smith | A61H 1/0255 |
| | | | | 623/27 |
| 2015/0321342 | A1* | 11/2015 | Smith | B25J 19/005 |
| | | | | 74/490.03 |
| 2017/0340504 | A1* | 11/2017 | Sanz Merodio | A61H 1/0262 |

* cited by examiner

Fig. 1A right-leg branch module    left-leg branch module

FLEXIBLE SUIT AND FLEXIBLE SYSTEM FOR REHABILITATION TRAINING OF HUMAN LEG

CROSS-REFERENCE TO RELATED APPLICATION

The present application claims priority of Chinese Patent Application No. 201821060140.8, filed on Jul. 5, 2018, the disclosure of which is incorporated herein by reference in its entirety as part of the present application.

TECHNICAL FIELD

The embodiments of the present disclosure relate to a flexible suit and a flexible system for rehabilitation training of a human leg.

BACKGROUND

Nowadays, with development of society, a trend of population aging becomes more and more serious gradually, and aging has gradually become a socialization problem. According to statistics, there are more than 60 countries in the world at present possessing such an elderly population that has reached or exceeded 10% of its total population, and entering into an aging society, and China is also in this rank. Physiological decline is common in the old people, and flexibility of their limbs decreases constantly, causing many inconveniences to daily life. At the same time, the number of patients with limbs and nerve injuries caused by heavy physical labor, traffic accidents, work injuries, local warfare and the like is also large. However, existing medical rehabilitation equipment is expensive, a nursing cost of patients is very high, and it is hard to solve the needs of the vast number of patients at present. So, products used in a limb rehabilitation device have a broad prospect of development.

SUMMARY

At least one embodiment of the present disclosure provides a flexible suit for rehabilitation training of a human leg, comprising a first hip joint motion assembly, a first knee joint motion assembly and a first ankle joint motion assembly. A first end of the first knee joint motion assembly is connected with the first hip joint motion assembly, a second end of the first knee joint motion assembly is connected with the first ankle joint motion assembly, the first hip joint motion assembly, the first knee joint motion assembly, and the first ankle joint motion assembly each comprises a flexible mechanism, and at least one of a group consisting of the first hip joint motion assembly, the first knee joint motion assembly, and the first ankle joint motion assembly is configured to operate under gas drive.

For example, in the flexible suit provided by at least one embodiment of the present disclosure, the first end of the first knee joint motion assembly is hinged with the first hip joint motion assembly, and the second end of the first knee joint motion assembly is hinged with the first ankle joint motion assembly.

For example, in the flexible suit provided by at least one embodiment of the present disclosure, the first hip joint motion assembly, the first knee joint motion assembly, and the first ankle joint motion assembly are all configured to operate under the gas drive.

For example, in the flexible suit provided by at least one embodiment of the present disclosure, the first knee joint motion assembly comprises: at least two pneumatic drive mechanisms respectively located on a first side and a second side of the first knee joint motion assembly, the at least two pneumatic drive mechanisms comprise pneumatic flexible drivers, respectively, and are configured to achieve a contractile movement under the gas drive, and the first side and the second side of the first knee joint motion assembly are two sides opposite to each other.

For example, in the flexible suit provided by at least one embodiment of the present disclosure, the first knee joint motion assembly further comprises: at least one upper connecting plate and at least one lower connecting plate, a first end of the at least one lower connecting plate is connected to a second end of the at least one upper connecting plate in one-to-one correspondence manner.

For example, in the flexible suit provided by at least one embodiment of the present disclosure, the first knee joint motion assembly further comprises: two upper connecting plates respectively located on a third side and a fourth side of the first knee joint motion assembly; and two lower connecting plates respectively located on the third side and the fourth side of the first knee joint motion assembly, first ends of the two lower connecting plates are connected to second ends of the two upper connecting plates in one-to-one correspondence manner, and the third side and the fourth side of the first knee joint motion assembly are two sides opposite to each other.

For example, in the flexible suit provided by at least one embodiment of the present disclosure, the first knee joint motion assembly further comprises: a thigh sheath, to which first ends of the at least two pneumatic drive mechanisms and first ends of the two upper connecting plates are all connected; and a shank sheath, to which second ends of the at least two pneumatic drive mechanisms and second ends of the two lower connecting plates are all connected.

For example, in the flexible suit provided by at least one embodiment of the present disclosure, the first ends of the two lower connecting plates are hinged to the second ends of the two upper connecting plates in one-to-one correspondence manner; the first ends of the at least two pneumatic drive mechanisms and the first ends of the two upper connecting plates are all hinged to the thigh sheath; and the second ends of the at least two pneumatic drive mechanisms and the second ends of the two lower connecting plates are all hinged to the shank sheath.

For example, in the flexible suit provided by at least one embodiment of the present disclosure, the at least two pneumatic drive mechanisms comprise pneumatic muscles, respectively.

For example, in the flexible suit provided by at least one embodiment of the present disclosure, the first hip joint motion assembly comprises: at least three pneumatic drive mechanisms respectively located on a first side, a second side and a third side of the first hip joint motion assembly, first ends of the at least three pneumatic drive mechanisms are all hinged to the first knee joint motion assembly by first hinge members, the at least three pneumatic drive mechanisms comprise pneumatic flexible drivers, respectively, and are configured to achieve a contractile movement under the gas drive, the first side of the first hip joint motion assembly and the second side of the first hip joint motion assembly are two sides opposite to each other, and the third side of the first hip joint motion assembly is a side adjacent to both the first side and the second side of the first hip joint motion assembly.

For example, in the flexible suit provided by at least one embodiment of the present disclosure, the first hip joint motion assembly further comprises: a waist sheath, to which second ends of the at least three pneumatic drive mechanisms are all hinged by second hinge members; and a braces, connected to the waist sheath.

For example, in the flexible suit provided by at least one embodiment of the present disclosure, the at least three pneumatic drive mechanisms comprise pneumatic muscles, respectively.

For example, in the flexible suit provided by at least one embodiment of the present disclosure, the first ankle joint motion assembly comprises: at least three pneumatic drive mechanisms respectively located on a first side, a second side and a third side of the first ankle joint motion assembly, first ends of the at least three pneumatic drive mechanisms are all hinged to the first knee joint motion assembly by third hinge members, the at least three pneumatic drive mechanisms comprise pneumatic flexible drivers, respectively, and are configured to achieve a contractile movement under the gas drive, the first side of the first ankle joint motion assembly and the second side of the first ankle joint motion assembly are two sides opposite to each other, and the third side of the first ankle joint motion assembly is a side adjacent to both the first side and the second side of the first ankle joint motion assembly.

For example, in the flexible suit provided by at least one embodiment of the present disclosure, the first ankle joint motion assembly further comprises: a pedal member, to which second ends of the at least three pneumatic drive mechanisms are all hinged by fourth hinge members.

For example, in the flexible suit provided by at least one embodiment of the present disclosure, the at least three pneumatic drive mechanisms comprise pneumatic muscles, respectively.

For example, the flexible suit provided by at least one embodiment of the present disclosure further comprises a second hip joint motion assembly, a second knee joint motion assembly and a second ankle joint motion assembly, a structure of the first hip joint motion assembly and a structure of the second hip joint motion assembly are identical, a structure of the first knee joint motion assembly and a structure of the second knee joint motion assembly are identical, a structure of the first ankle joint motion assembly and a structure of the second ankle joint motion assembly are identical, the first hip joint motion assembly and the second hip joint motion assembly are arranged in left-right symmetric manner, the first knee joint motion assembly and the second knee joint motion assembly are arranged in left-right symmetric manner, and the first ankle joint motion assembly and the second ankle joint motion assembly are arranged in left-right symmetric manner.

At least one embodiment of the present disclosure further provides a flexible system, comprising a pneumatic control system and the flexible suit according to any one of the above embodiments, the first hip joint motion assembly, the first knee joint motion assembly, and the first ankle joint motion assembly in the flexible suit are all connected to the pneumatic control system, and the pneumatic control system is configured to control, based on the gas drive, at least one of the group consisting of the first hip joint motion assembly, the first knee joint motion assembly, and the first ankle joint motion assembly to operate.

For example, in the flexible system provided by at least one embodiment of the present disclosure, the pneumatic control system comprises: a gas supply device; a plurality of solenoid valves, in which first ends of the plurality of solenoid valves are all connected with the gas supply device, and second ends of the plurality of solenoid valves are connected to a plurality of pneumatic drive mechanisms in the flexible suit in one-to-one correspondence manner; and a control device, communicating with the gas supply device and the plurality of solenoid valves.

For example, in the flexible system provided by at least one embodiment of the present disclosure, the gas supply device comprises a gas source generator and a pneumatic pressure reduction valve connected to each other, and the first ends of the plurality of solenoid valves are all connected to the pneumatic pressure reduction valve.

For example, in the flexible system provided by at least one embodiment of the present disclosure, the first ends of the plurality of solenoid valves are also connected with the control device, the control device comprises a controller and a drive circuit electrically connected to each other, the plurality of solenoid valves communicate with the drive circuit, and the pneumatic pressure reduction valve communicates with the controller.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to make the following description of the embodiments of the present disclosure clear and concise, the present disclosure omits detailed description of known functions and known components.

In the following descriptions, many specifics details are set forth so as to provide a thorough understanding of the embodiments of the present disclosure, but the embodiments of the present disclosure may also be implemented in other ways than those described herein. Therefore, the protection scope of the present disclosure is not limited by the specific embodiments disclosed below.

It should be noted that, in the following description of the present disclosure, a front side, a rear side, a left side, a right side, an upper end, a lower end and so on, are all stated relative to a human body. For example, a side on which the human face is located is the front side, a side opposite the front side is the rear side, a side on which a left hand of the human body is located is the left side, a side on which a right side of the human body is located is the right side, an end of the human body near its feet is the lower end, and an end of the human body near its head is the upper end.

Hereinafter, a flexible suit for rehabilitation training of a human leg in some embodiments of the present disclosure will be described in conjunction with the accompanying drawings.

Figure 1A:
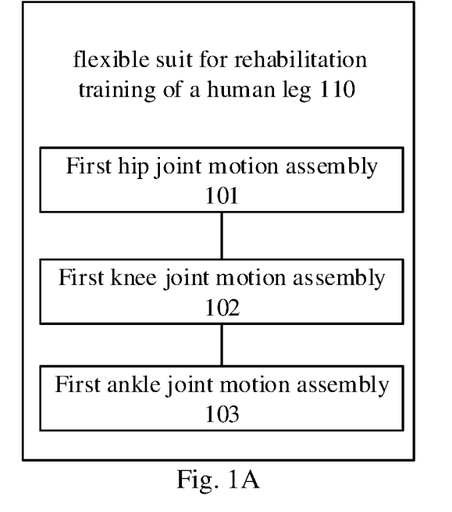
FIG. 1A is a schematic block diagram of a flexible suit for rehabilitation training of a human leg provided by at least one embodiment of the present disclosure.

At least one embodiment of the present disclosure provides a flexible suit for rehabilitation training of a human leg. FIG. 1A is a schematic block diagram of a flexible suit for rehabilitation training of a human leg provided by at least one embodiment of the present disclosure; and FIG. 1B is a stereo structure schematic view of a flexible suit for rehabilitation training of a human leg provided by at least one embodiment of the present disclosure.

For example, as shown in FIG. 1A, a flexible suit 110 for rehabilitation training of a human leg may include a first hip joint motion assembly 101 (or a hip joint motion module), a first knee joint motion assembly 102 (or a knee joint motion module) and a first ankle joint motion assembly 103 (or an ankle joint motion module).

Figure 1B:
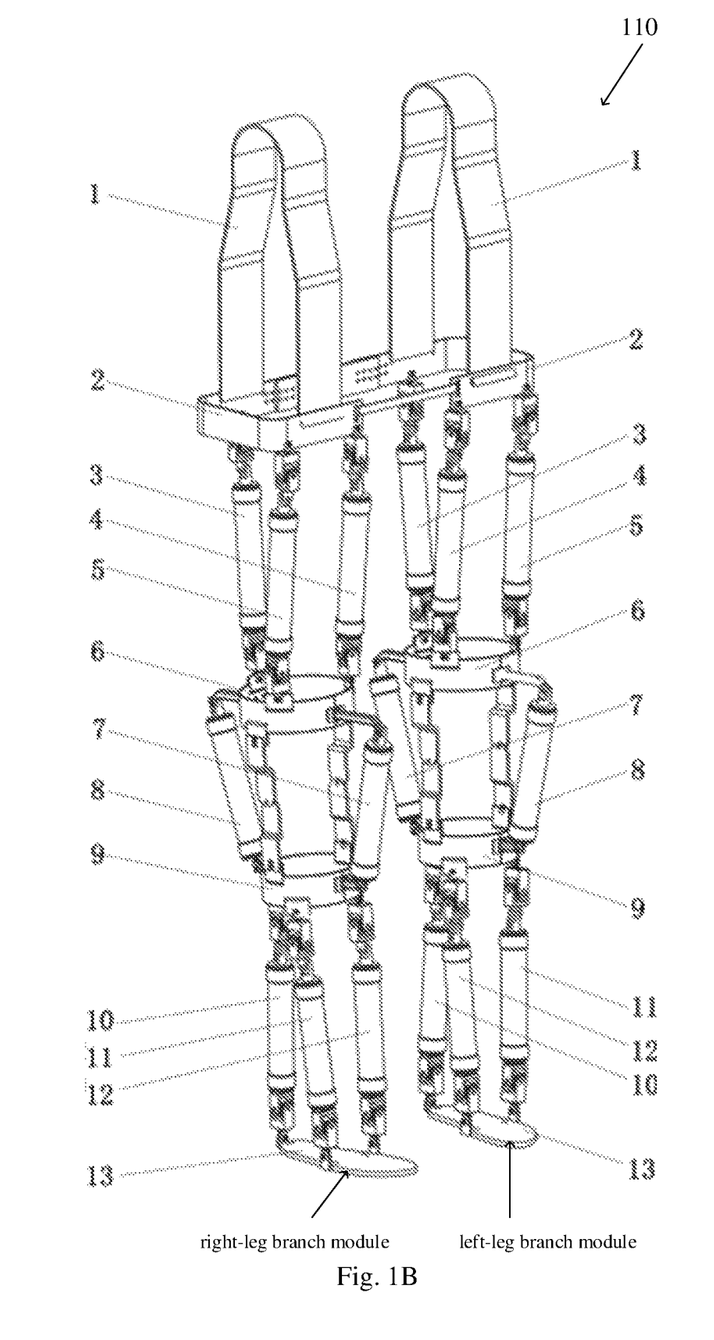
FIG. 1B is a stereo structure schematic view of a flexible suit for rehabilitation training of a human leg provided by at least one embodiment of the present disclosure.

For example, as shown in FIGS. 1A and 1B, a first end of the first knee joint motion assembly 102 (e.g. an upper end) is connected with the first hip joint motion assembly 101, and a second end (e.g. a lower end) of the first knee joint motion assembly 102 is connected with the first ankle joint motion assembly 103. For example, in some examples, the first end of the first knee joint motion assembly 102 is hinged with the first hip joint motion assembly 101, and the second end of the first knee joint motion assembly 102 is hinged with the first ankle joint motion assembly 103.

For example, the first hip joint motion assembly 101, the first knee joint motion assembly 102 and the first ankle joint motion assembly 103 each comprises a flexible mechanism, and at least one of a group consisting of the first hip joint motion assembly 101, the first knee joint motion assembly 102 and the first ankle joint motion assembly 103 is configured to operate under gas drive.

For example, in some embodiments, the first hip joint motion assembly 101, the first knee joint motion assembly 102 and the first ankle joint motion assembly 103 are all configured to operate under the gas drive.

For example, in some embodiments, the first hip joint motion assembly 101, the first knee joint motion assembly 102, and the first ankle joint motion assembly 103 are all connected to a pneumatic control system, and the pneumatic control system is configured to control the first hip joint motion assembly 101, the first knee joint motion assembly 102 and the first ankle joint motion assembly 103 to operate.

Regarding the flexible suit for rehabilitation training of a human leg provided by the present disclosure, the first hip joint motion assembly 101, the first knee joint motion assembly 102, and the first ankle joint motion assembly 103 each comprises a flexible mechanism, and the first hip joint motion assembly 101, the first knee joint motion assembly 102, and the first ankle joint motion assembly 103 are all connected with the pneumatic control system, the pneumatic control system drives by a pneumatic manner the first hip joint motion assembly 101, the first knee joint motion assembly 102 and the first ankle joint motion assembly 103 to operate. The manufactured flexible suit has the advantages of a high power density ratio, strong flexibility, good safety and comfort performance, convenient material selection, easy to manufacture, a low cost, light in weight, flexible, and the like, and also does not cause problems such as being uncomfortable to wear, being harmful to the human body and so on.

For example, as shown in FIG. 1B, the flexible suit 110 includes two hip joint motion assemblies 101, two knee joint motion assemblies 102 and two ankle joint motion assemblies 103, the two knee joint motion assemblies 102 are arranged in left-right symmetric manner, the two ankle motion assemblies 103 are arranged in left-right symmetric manner, and the two hip joint motion assemblies 101 are arranged in left-right symmetric manner. That is, the two hip joint motion assemblies are left-right symmetrically arranged in two groups, the two knee joint motion assemblies are left-right symmetrically arranged in two groups, and the two ankle joint motion assemblies are left-right symmetrically arranged in two groups. For example, the flexible suit 110 further includes a second hip joint motion assembly, a second knee joint motion assembly and a second ankle joint motion assembly, namely, the two hip joint motion assemblies 101 include a first hip joint motion assembly and a second hip joint motion assembly, the two knee joint motion assemblies 102 include a first knee joint motion assembly and a second knee joint motion assembly, and the two ankle joint motion assemblies 103 includes a first ankle joint motion assembly and a second ankle joint motion assembly, a structure of the first hip joint motion assembly and a structure of the second hip joint motion assembly are identical, a structure of the first knee joint motion assembly and a structure of the second knee joint motion assembly are identical, a structure of the first ankle joint motion assembly and a structure of the second ankle joint motion assembly are identical. The first knee joint motion assembly is connected with the first hip joint motion assembly and the first ankle joint motion assembly, so that the first hip joint motion assembly, the first knee joint motion assembly and the first ankle joint motion assembly form a right-leg branch module, and the second knee joint motion assembly is connected with the second hip joint motion assembly and the second ankle joint motion assembly, so that the second hip joint motion assembly, the second knee joint motion assembly and the second ankle joint motion assembly form a left-leg branch module. The left-leg branch module and the right-leg branch module are also arranged symmetrically, and the flexible suit provided by an embodiment of the present disclosure will be described in detail below by taking the right-leg branch module as an example.

For example, in the flexible suit provided by the embodiment of the present disclosure, the first hip joint motion assembly 101 has three degrees of freedom (DOF), the first knee joint motion assembly 102 has one degree of freedom, and the first ankle joint motion assembly 103 has three degrees of freedom. That is, the first hip joint motion assembly 101 is a 3DOF flexible parallel mechanism, the first knee joint motion assembly 102 is a 1DOF flexible antagonistic mechanism, and the first ankle joint motion assembly 103 is a 3DOF flexible parallel mechanism. Thus, the left-leg branch module has 7 degrees of freedom, and the right-leg branch module also has 7 degrees of freedom. Consequently, the movement of each joint in legs can be controlled more flexibly, and such a function that patients do rehabilitation training exercise by simulating the normal person's pace law is achieved.

Figure 2:
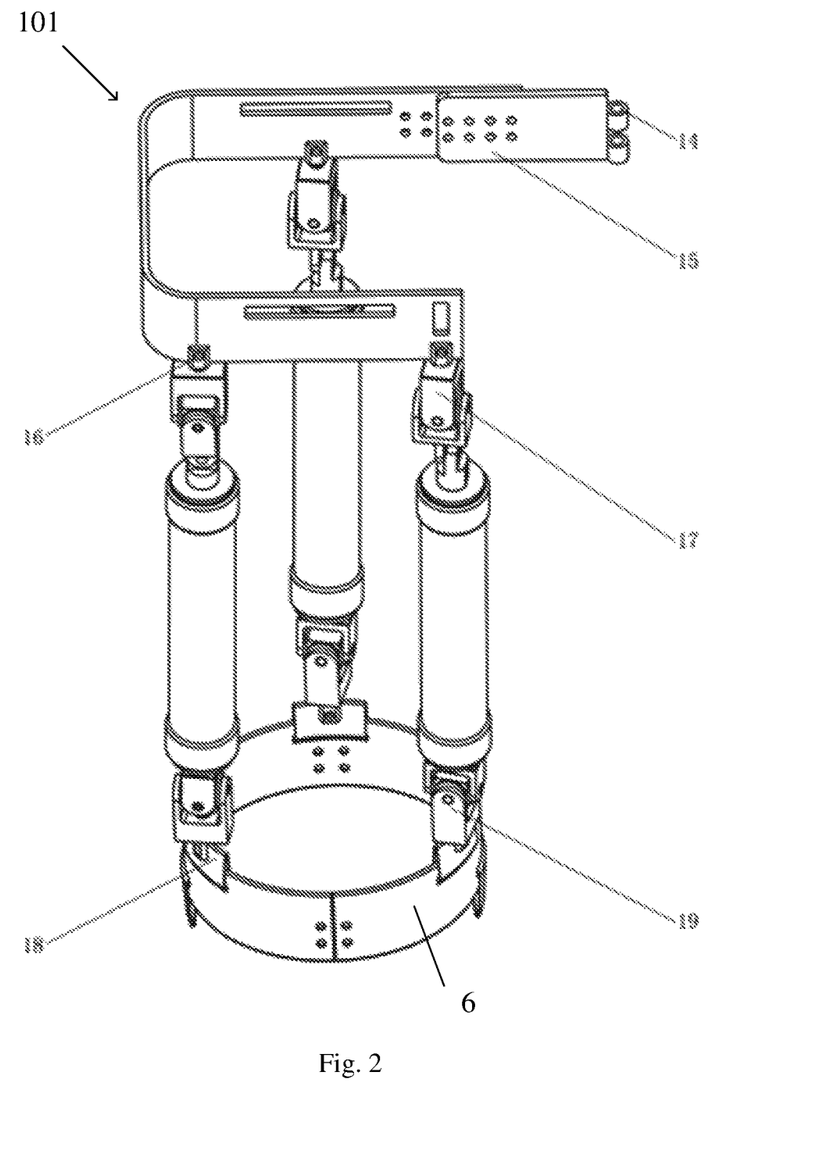
FIG. 2 is a structural schematic view of the first hip joint motion assembly in FIG. 1.
Figure 3:
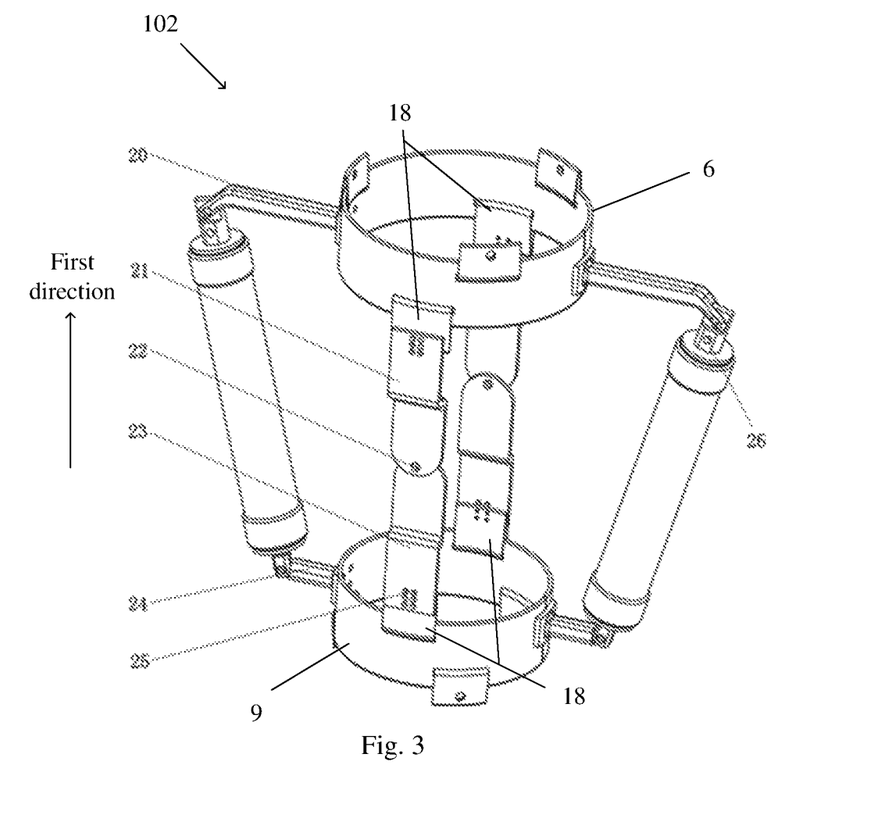
FIG. 3 is a structural schematic view of the first knee joint motion assembly in FIG. 1.
Figure 4:
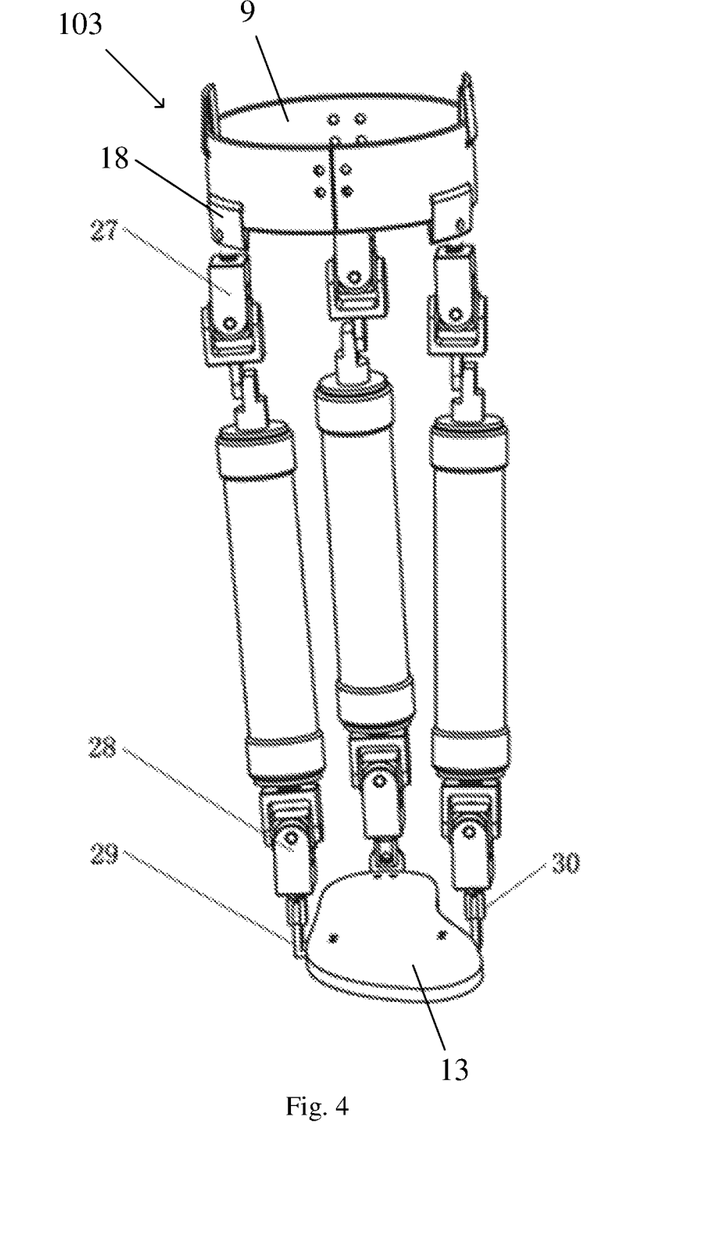
FIG. 4 is a structural schematic view of the first ankle joint motion assembly in FIG. 1.

FIG. 2 is a structural schematic view of the first hip joint motion assembly in FIG. 1, FIG. 3 is a structural schematic view of the first knee joint motion assembly in FIG. 1, and FIG. 4 is a structural schematic view of the first ankle joint motion assembly in FIG. 1.

For example, as shown in FIGS. 1B and 3, the first knee joint motion assembly 102 includes at least two pneumatic drive mechanisms respectively located on a first side and a second side of the first knee joint motion assembly 102, and the at least two pneumatic drive mechanisms comprise pneumatic flexible drivers, respectively, and are configured to achieve a contractile movement under the gas drive. Namely, the at least two pneumatic drive mechanisms are pneumatic flexible drivers. For example, the at least two pneumatic drive mechanisms comprise pneumatic muscles, respectively, namely the at least two pneumatic drive mechanisms are pneumatic muscles. It is to be noted that, in the embodiment of the present disclosure, the first knee joint motion assembly 102 including two pneumatic drive mechanisms is taken as an example, but the present disclosure is not limited to this case. Depending on the actual application requirements, the first knee joint motion assembly 102 may also include three or four pneumatic drive mechanisms.

For example, the first side of the first knee joint motion assembly 102 and the second side of the first knee joint motion assembly 102 are two sides which are opposite to each other. For example, the first side of the first knee joint motion assembly 102 is a front side, and the second side of the first knee joint motion assembly 102 is a rear side. Namely, the first knee joint motion assembly 102 (having one degree of freedom) includes two pneumatic drive mechanisms (i.e. a pneumatic muscle 7, a pneumatic muscle 8 shown in FIG. 1B, for the right-leg branch module, the pneumatic muscle 7 is located at a front side of the first knee joint motion assembly 102, and the pneumatic muscle 8 is located at a rear side of the first knee joint motion assembly 102; and for the left-leg branch module, the pneumatic muscle 7 is located at a rear side of the first knee joint motion assembly 102, and the pneumatic muscle 8 is located at a front side of the first knee joint motion assembly 102) respectively located on a front side and a rear side of the first knee joint motion assembly 102. The two pneumatic drive mechanisms are connected to the pneumatic control system, so as to achieve a contractile movement under the control of the pneumatic control system.

For example, in some embodiments, the first knee joint motion assembly 102 further includes at least one upper connecting plate and at least one lower connecting plate, and a first end of the at least one lower connecting plate is connected (e.g. hinged) to a second end of the at least one upper connecting plate in one-to-one correspondence manner.

For example, in some examples, the first knee joint motion assembly 102 includes one upper connecting plate and one lower connecting plate, the upper connecting plate and the lower connecting plate are located on one side (for example, a left side or a right side) of the first knee joint motion assembly 102, and a first end of the lower connecting plate is correspondingly connected to a second end of the upper connecting plate.

For example, as shown in FIGS. 1B and 3, the first knee joint motion assembly 102 further includes two upper connecting plates respectively located on a third side and a fourth side of the first knee joint motion assembly 102 and two lower connecting plates respectively located on the third side and the fourth side of the first knee joint motion assembly 102. The third side of the first knee joint motion assembly 102 and the fourth side of the first knee joint motion assembly 102 are two sides which are opposite to each other, and the third side of the first knee joint motion assembly 102 is adjacent to both the first side and the second side of the first knee joint motion assembly 102. That is, the first side of the first knee joint motion assembly 102 and the third side of the first knee joint motion assembly 102 are two adjacent sides, and the second side of the first knee joint motion assembly 102 and the third side of the first knee joint motion assembly 102 are also two adjacent sides. The fourth side of the first knee joint motion assembly 102 is also adjacent to both the first side and the second side of the first knee joint motion assembly 102. For example, the third side of the first knee joint motion assembly 102 is a left side, and the fourth side of the first knee joint motion assembly 102 is a right side, that is, the first knee joint motion assembly 102 further includes two upper connecting plates 21 respectively located at the left side and the right side; and two lower connecting plates 23 respectively located at the left side and the right side. For example, first ends (e.g., upper ends) of the two lower connecting plates 23 are connected to second ends (e.g., lower ends) of the two upper connecting plates 21 in one-to-one correspondence manner, for example, the first ends of the two lower connecting plates 23 are hinged to the second ends of the two upper connecting plates 21 in one-to-one correspondence manner.

For example, the upper connecting plate 21 and the lower connecting plate 23 can be made of a material without elasticity or lower elasticity, and for example, in some examples, both the upper connecting plate 21 and the lower connecting plate 23 may be rigid elements.

For example, as shown in FIGS. 1B and 3, the first knee joint motion assembly 102 further includes a thigh sheath 6 and a shank sheath 9. First ends (e.g., upper ends) of the at least two pneumatic drive mechanisms and first ends (e.g., upper ends) of the two upper connecting plates 21 are all connected to the thigh sheath 6; and second ends (e.g., lower ends) of the at least two pneumatic drive mechanisms and second ends (e.g., lower ends) of the two lower connecting plates 23 are all connected to the shank sheath 9, for example, in some examples, the upper ends of the at least two pneumatic drive mechanisms and the upper ends of the two upper connecting plates 21 are all hinged to the thigh sheath 6; and the lower ends of the at least two pneumatic drive mechanisms and the lower ends of the two lower connecting plates 23 are all hinged to the shank sheath 9.

For example, the upper connecting plates 21 and the lower connecting plates 23 are used to limit a distance between the thigh sheath 6 and the shank sheath 9.

It is to be noted that, an upper end (that is, the first end) of a pneumatic drive mechanism denotes an end of the pneumatic drive mechanism close to the thigh sheath 6, and a lower end (that is, the second end) of a pneumatic drive mechanism denotes an end of the pneumatic drive mechanism close to the shank sheath 9. An upper end (that is, the first end) of a lower connecting plate 23 denotes an end of the lower connecting plate 23 near the thigh sheath 6, and a lower end (that is, the second end) of a lower connecting plate 23 denotes an end of the lower connecting plate 23 near the shank sheath 9. An upper end (that is, the first end) of an upper connecting plate 21 denotes an end of the upper connecting plate 21 near the thigh sheath 6, and a lower end (that is, the second end) of an upper connecting plate 21 denotes an end of the upper connecting plate 21 near the shank sheath 9.

As shown in FIGS. 1B and 3, in the first knee joint motion assembly 102, the thigh sheathing 6 is connected to the rigid upper connecting plate 21 by a flexible connector 18, the shank sheath 9 is connected to the rigid lower connecting plate 23 by a flexible connector 18, and the upper connecting plate 21 and the lower connecting plate 23 form a knee joint revolute pair 22 by a pin (for example, a cylindrical pin, a cone pin, a perforated pin, a cotter pin, and a safety pin, etc.). A plurality of holes 25 corresponding to the flexible connectors 18 are formed on the upper connecting plate 21 and the lower connecting plate 23, so that positions of the thigh sheath 6 and the shank sheath 9 can be adjusted in a first direction (that is, an up-down direction). The thigh sheath 6 is fitted with two upper supporting rods 20 that are front-and-rear symmetrical, and the shank sheath 9 is fitted with two lower supporting rods 24 that are front-and-rear symmetrical. The pneumatic muscle 7 is installed on a corresponding upper supporting rod 20 and a corresponding lower supporting rod 24 by means of pin connection, and the pneumatic muscle 8 is mounted on a corresponding upper supporting rod 20 and a corresponding lower supporting rod 24 by means of pin connection. Thereby, the first knee joint motion assembly 102 is formed.

For example, as shown in FIGS. 1B and 2, the first hip joint motion assembly 101 includes at least three pneumatic drive mechanisms respectively located at a first side, a second side and a third side of the first hip joint motion assembly 101, and first ends of the at least three pneumatic drive mechanisms are all hinged to the first knee joint motion assembly 102 via first hinge members.

For example, the at least three pneumatic drive mechanisms comprise pneumatic flexible drivers, respectively, and are configured to achieve a contractive movement under the gas drive. For example, in some examples, the at least three pneumatic drive mechanisms comprise pneumatic muscles, respectively.

It should be noted that, in the embodiment of the present disclosure, the first hip joint motion assembly 101 including three pneumatic drive mechanisms is taken as an example, but the present disclosure is not limited to this case. Depending on the actual application requirements, the first hip joint motion assembly 101 may also include four or five pneumatic drive mechanisms.

The first side of the first hip joint motion assembly 101 and the second side of the first hip joint motion assembly 101 are two sides which are opposite to each other, and the third side of the first hip joint motion assembly 101 is a side of the first hip joint motion assembly 101 adjacent to both the first side and the second side of the first hip joint motion assembly 101. For example, in some embodiments, the first side of the first hip joint motion assembly 101 is a left side of the first hip joint motion assembly 101, the second side of the first hip joint motion assembly 101 is a right side of the first hip joint motion assembly 101, and the third side of the first hip joint motion assembly 101 is a rear side of the first hip joint motion assembly 101. Thus, as shown in FIGS. 1B and 2, the first hip joint motion assembly 101 (having three degrees of freedom) includes three pneumatic drive mechanisms (that is, a pneumatic muscle 3, a pneumatic muscle 4, and a pneumatic muscle 5 as shown in FIG. 1B, for the right-leg branch module, the pneumatic muscle 3 is located at the rear side of the first hip joint motion assembly 101, the pneumatic muscle 4 is located at the left side of the first hip joint motion assembly 101, and the pneumatic muscle 5 is located at the right side of the first hip joint motion assembly 101; and for the left-leg branch module, the pneumatic muscle 3 is located at the rear side of the first hip joint motion assembly 101, the pneumatic muscle 5 is located at the left side of the first hip joint motion assembly 101, and the pneumatic muscle 4 is located at the right side of the first hip joint motion assembly 101) respectively located on the left side, the right side and the rear side of the first hip joint motion assembly 101. For example, the three pneumatic drive mechanisms of the first hip joint motion assembly 101 may be connected with the pneumatic control system, so as to achieve the contractile movement under the control of the pneumatic control system.

For example, first ends (e.g., lower ends) of the three pneumatic drive mechanisms are all hinged to the first knee joint motion assembly 102 by, for example, first hinge members (e.g., Hooke hinges).

For example, as shown in FIGS. 1B and 2, the first hip joint motion assembly 101 further includes a waist sheath 2 and a braces 1, and second ends (e.g., upper ends) of the three pneumatic drive mechanisms are all hinged to the waist sheath 2 by second hinge members (e.g., Hooke hinges); the braces 1 is connected to the waist sheath 2.

For example, the braces 1 may be a flexible braces.

It should be noted that, in the present disclosure, the structures, functions and the like of the first hinge member and the second hinge member may be the same, but the first hinge member and the second hinge member are disposed at different positions.

For example, as shown in FIGS. 1B and 2, the first hip joint motion assembly 101 includes the pneumatic muscle 3, the pneumatic muscle 4, and the pneumatic muscle 5 that are parallel, upper ends and lower ends of the pneumatic muscle 3, the pneumatic muscle 4, and the pneumatic muscle 5 are respectively connected to Hooke hinges. Hooke hinges 17 located at the upper ends (i.e., ends of the pneumatic muscle 3, pneumatic muscle 4 and pneumatic muscle 5 near the waist sheath 2) are connected to the waist sheath 2 by bolts 16. The waist sheath 2 is provided with an adjustment mechanism (used for adjusting the waist size) including a locking screw and a waist adjustment plate 15, and two waist adjustment plates 15 are connected by a pin to form a waist revolute pair 14, which is convenient for a wearer to wear. Hooke hinges 19 located at the lower ends (i.e., ends of the pneumatic muscle 3, pneumatic muscle 4, and pneumatic muscle 5 near the thigh sheath 6) are connected by bolts 16 to flexible connectors 18 on the thigh sheath 6. For example, a shape of the thigh sheath 6 is a ring shape, such as a circular ring shape, and three flexible connectors 18 are evenly distributed around the circumference of the ring-shaped thigh sheath 6. The size of the thigh sheath 6 can be adjusted according to a diameter of the human thigh, and the size of the shank sheath 9 can also be adjusted according to a diameter of the human shank.

For example, as shown in FIGS. 1B and 4, the first ankle joint motion assembly 103 includes at least three pneumatic drive mechanisms respectively located at a first side, a second side and a third side of the first ankle joint motion assembly 103, and first ends of the at least three pneumatic drive mechanisms are all hinged to the first knee joint motion assembly 102 via third hinge members.

For example, the at least three pneumatic drive mechanisms comprise pneumatic flexible drivers, respectively, and are configured to achieve a contractile movement under the gas drive. For example, in some examples, the at least three pneumatic drive mechanisms comprise pneumatic muscles, respectively.

It should be noted that, in the embodiment of the present disclosure, the first ankle joint motion assembly 103 including three pneumatic drive mechanisms is taken as an example, but the present disclosure is not limited to this case. Depending on the actual application requirements, the first ankle joint motion assembly 103 may also include four or five pneumatic drive mechanisms.

For example, the first side of the first ankle joint motion assembly 103 and the second side of the first ankle joint motion assembly 103 are two sides which are opposite to each other, and the third side of the first ankle joint motion assembly 103 is a side of the first ankle joint motion assembly 103 adjacent to both the first side and the second side of the first ankle joint motion assembly 103. For example, in some embodiments, the first side of the first ankle joint motion assembly 103 is a left side of the first ankle joint motion assembly 103, the second side of the first ankle joint motion assembly 103 is a right side of the first ankle joint motion assembly 103, and the third side of the first ankle joint motion assembly 103 is a rear side of the first ankle joint motion assembly 101. Thus, as shown in FIGS. 1B and 4, the first ankle joint motion assembly 103 (having three degrees of freedom) includes three pneumatic drive mechanisms (that is, a pneumatic muscle 10, a pneumatic muscle 11, and a pneumatic muscle 12 as shown in FIG. 1B, for the right-leg branch module, the pneumatic muscle 10 is located at the rear side of the first ankle joint motion assembly 103, the pneumatic muscle 12 is located at the left side of the first ankle joint motion assembly 103, and the pneumatic muscle 11 is located at the right side of the first ankle joint motion assembly 103; and for the left-leg branch module, the pneumatic muscle 10 is located at the rear side of the first ankle joint motion assembly 103, the pneumatic muscle 11 is located at the left side of the first ankle joint motion assembly 103, and the pneumatic muscle 12 is located at the right side of the first ankle joint motion assembly 103) respectively located on the left side, the right side and the rear side. For example, the three pneumatic drive mechanisms of the first ankle joint motion assembly 103 may be connected with the pneumatic control system, so as to achieve the contractile movement under the control of the pneumatic control system.

For example, first ends (e.g., upper ends) of the three pneumatic drive mechanisms are all hinged to the first knee joint motion assembly 102 by third hinge members (e.g., Hooke hinges).

For example, as shown in FIGS. 1B and 4, the first ankle joint motion assembly 103 further includes a pedal member, and second ends (e.g., lower ends) of the three pneumatic drive mechanisms are all hinged to the pedal member by fourth hinge members. The pedal member includes a pedal 13 and pedal brackets 29.

It should be noted that, in the present disclosure, the structures, functions and so on of the third hinge member and the fourth hinge member may be the same, but the third hinge member and the fourth hinge member are disposed at different positions.

For example, as shown in FIGS. 1B and 4, the first ankle joint motion assembly 103 includes a pneumatic muscle 10, a pneumatic muscle 11, and a pneumatic muscle 12 that are parallel, and upper ends and lower ends of the pneumatic muscle 10, the pneumatic muscle 11, and the pneumatic muscle 12 are connected to Hooke hinges. Hooke hinges 27 located at the upper ends (i.e., ends of the pneumatic muscle 10, pneumatic muscle 11, and pneumatic muscle 12 near the shank sheath 9) are connected by bolts 30 to flexible connectors 18 on the shank sheath 9. For example, a shape of the shank sheath 9 may also be a ring shape, such as a circular ring shape, and three flexible connectors 18 (used to improve the wearing comfort property and the pneumatic muscle's ability to swing) are evenly distributed on the circumference of the shank sheath 9. Hooke hinges 28 located at the lower ends (that is, ends of the pneumatic muscle 10, the pneumatic muscle 11, and the pneumatic muscle 12 near the pedal member) are connected to the pedal brackets 29 by bolts 30, and grooves is formed in the pedal 13, and the pedal brackets 29 are installed in the grooves. After a human foot is placed on the pedal 13, a human shoe is bound to the pedal 13 with a soft bandage, and then the pedal 13 is placed on the pedal brackets 29. The pedal 13 and the pedal brackets 29 are connected together detachably (for example, the pedal 13 and the pedal brackets 29 are snap-fitted together, and the mechanism used to connect the pedal 13 and the pedal brackets 29 may be a snap-fit structure of a tab and a slot).

In summary, the flexible suit 110 provided by the embodiment of the present disclosure is driven by 16 pneumatic muscles, so as to achieve a lower limb rehabilitation training exercise for wearers (for example, patients with limb injuries and old persons with muscular atrophy, etc.). In addition, each motion assembly may also be used for performing a targeted rehabilitation and physiotherapy training on the wearer's hip joint, knee joint, ankle joint and the like independently. The flexible suit 110 can be widely applied to rehabilitation and physiotherapy, family service and other fields.

Figure 5:
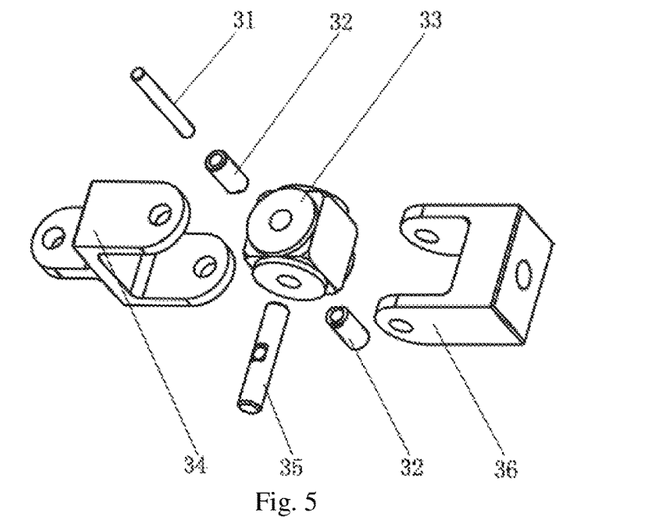
FIG. 5 is a schematic view of an exploded structure of a Hooke hinge in FIG. 1.

FIG. 5 is a schematic view of an exploded structure of a Hooke hinge in FIG. 1.

For example, as shown in FIG. 5, any of the Hooke hinges described above has two rotational degrees of freedom, and a front end member 36 and a rear end member 34 are connected to a Hooke hinge cross block 33 by a Hooke hinge long shaft 35 and two Hooke hinge short shafts 32. A Hooke hinge pin shaft 31 is used to fix the two Hooke hinge short shafts 32 and the Hooke hinge cross block 33 together, the front end member 36 is in clearance fit with the Hooke hinge long shaft 35 so as to form a revolute pair, and the rear end member 34 is in clearance fit with the Hooke hinge short shafts 32 so as to form a revolute pair. The Hooke hinge pin shaft 31 is in interference fit with the Hooke hinge short shafts 32, so that the Hooke hinge cross block 33, the Hooke hinge short shafts 32 and the Hooke hinge long shaft 35 are integrated into a whole. In this way, each of Hooke hinges can achieve the movement of two degrees of freedom, so as to ensure that each of the joint motion assembles can match with the joint motion of a human body, thus avoiding occurrence of a phenomenon of motion interference.

For example, other connecting elements such as universal hinges or the like may also be chosen as the hinge members (e.g., the first hinge member, the second hinge member, the third hinge member, and the fourth hinge member). The purpose of the present disclosure can also be implemented by the universal hinges, and its aim does not depart from the design idea of the present disclosure, details are omitted here. All such cases should fall within the protection scope of the present disclosure.

Figure 6:
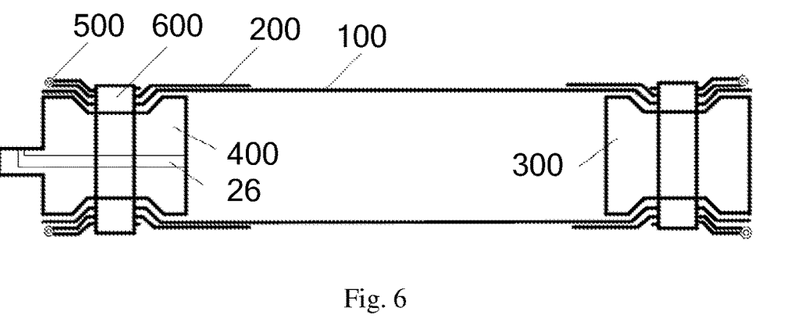
FIG. 6 is a structural schematic view of a pneumatic drive mechanism in FIG. 1.

FIG. 6 is a structural schematic view of a pneumatic drive mechanism in FIG. 1.

For example, in the present disclosure, any one of the pneumatic drive mechanisms may be a pneumatic muscle. As shown in FIG. 6, a main body of a pneumatic muscle, as a new type of driver, is a rubber tube 100, and the pneumatic muscle further includes a woven mesh 200, a first plug 300, a second plug 400, etc. The outer side of the rubber tube 100 is covered with a layer of the woven mesh 200 formed by a material of Polyethylene terephthalate (PET) plastic, and two ends of the rubber tube 100 are sleeved on the first plug 300 and the second plug 400 located at the two ends, respectively. The first plug 300 at a first end of the rubber tube 100 is closed, and completely blocks the rubber tube 100 to prevent air leakage, and the second plug 400 at a second end of the rubber tube 100 has an air hole 26 formed inside, through which the rubber tube 100 is inflated and deflated by the external gas, so as to achieve inflation and deflation of the inside of the pneumatic muscle (that is, rubber tube 100). Next, a black adhesive tape is used to wrap around the rubber tube 100 and the woven mesh 200, for example, two to three circles, at inwards-recessed parts of the second plug 400 and the first plug 300 at two ends of the rubber tube 100, and the main purpose is to stick the rubber tube 100 and the woven mesh 200 tightly together at the inwards-recessed parts of the first plug 300 and the second plug 400. A coil of copper wire 500 is wound at the edge of inwards-recessed parts of the first plug 300 and the second plug 400 at two ends of the rubber tube 100, so as to prevent the woven mesh 200 from releasing under high pressure. Then, the woven mesh 200 is folded, so that the copper wire 500 is arranged at a bending area at an end of the woven mesh 200. The folded woven mesh 200 extends to a position of a tail of a corresponding plug, that is, a woven mesh 200 corresponding to the first plug 300 extends to a position of a tail of the first plug 300 near the second plug 400, and a woven mesh 200 corresponding to the second plug 400 extends to a position of a tail of the second plug 400 near the first plug 300. The inwards-recessed parts of the second plug 400 and the first plug 300 are clamped tightly by clamps 600, so as to prevent the pneumatic muscles from leaking air on one hand, and on the other hand, to prevent the pneumatic muscles from collapsing under the state of internal high pressure. The design of the second plug 400 and the first plug 300 is very flexible, and according to the requirements of connecting mode, different connecting forms can be designed.

It is to be noted that, requirements for the rubber tube 100 are to have a certain degree of toughness and elasticity, to be able to expand and shrink in inflated and deflated states, and to have an excellent fatigue resistance, and requirements for the woven mesh 200 are to have a very high non-ductility, and excellent strength and toughness, but have no tensile deformation. Materials of the second plug 400 and the first plug 300 may be hard non-metallic materials with very high density, and may also be metallic materials with high strength and low density. The clamps 600 may be stainless steel clamping pieces as employed normally, and may also be self-designed aluminum alloy members with higher strength.

During a process of inflating the inside of a pneumatic muscle (that is, the rubber tube 100), the pneumatic muscle will expand radially and shrinks axially, and an axial driving force produced by its axial contraction is used to drive an external load connected thereto. Moreover, the rigidity of the pneumatic muscle increases continuously along with rising of internal (that is, rubber tube 100) pressure, and decreases continuously along with decreasing of internal (that is, rubber tube 100) pressure. According to characteristics of the pneumatic muscle, the pneumatic muscle can be used as a new linear driver, and as compared with a traditional driver such as a hydraulic cylinder, a pneumatic cylinder, a motor or the like, the pneumatic muscle has a very light weight, and a length of the pneumatic muscle can be designed by considering the contractile rate of the pneumatic muscle itself according to the need of driving stroke. In this way, the danger caused by over stroke can be avoided, and the cost is very cheap. Moreover, the pneumatic muscle has good flexibility and safety, and can be widely used in the field of rehabilitation medicine.

At least one embodiment of the present disclosure further provides a flexible system for rehabilitation training of a human leg.

Figure 7:
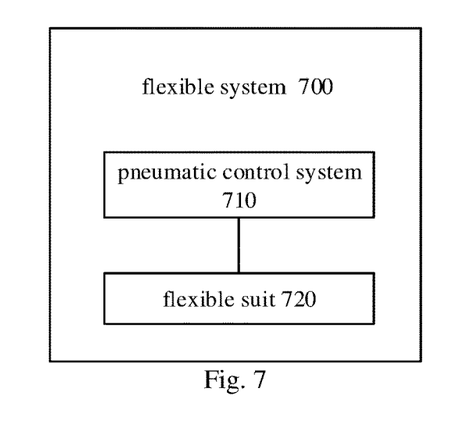
FIG. 7 is a schematic diagram of a flexible system for rehabilitation training of a human leg provided by at least one embodiment of the present disclosure.
Figure 8:
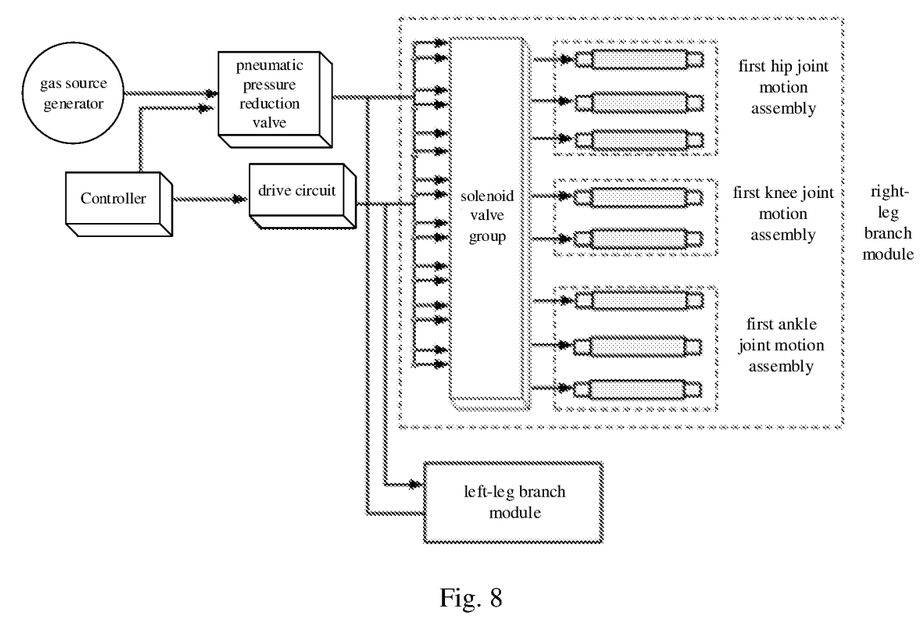
FIG. 8 is a flow chart of a pneumatic control system provided by at least one embodiment of the present disclosure.

FIG. 7 is a schematic diagram of a flexible system for rehabilitation training of a human leg provided by at least one embodiment of the present disclosure, FIG. 8 is a flow chart of a pneumatic control system provided by at least one embodiment of the present disclosure.

For example, as shown in FIG. 7, a flexible system 700 for rehabilitation training of a human leg may include a pneumatic control system 710 and a flexible suit 720. For example, the flexible suit 720 may be the flexible suit 110 according to any of the above-mentioned embodiments.

For example, a first hip joint motion assembly, a first knee joint motion assembly, and a first ankle joint motion assembly in the flexible suit 720 are all connected to the pneumatic control system 710, and the pneumatic control system 710 is configured to control, based on the gas drive, at least one of the group consisting of the first hip joint motion assembly, the first knee joint motion assembly and the first ankle joint motion assembly to operate. For example, in some embodiments, the pneumatic control system 710 is configured to control the first hip joint motion assembly, the first knee joint motion assembly and the first ankle joint motion assembly to operate. Regarding relevant description of the flexible suit 720, reference may be made to the relevant detailed descriptions of the flexible suit 110 in any of the above embodiments, and details are not described herein again.

For example, as shown in FIG. 8, in some embodiments, the pneumatic control system 720 may include a gas supply device, a plurality of solenoid valves (forming a solenoid valve group) and a control device. First ends of the plurality of solenoid valves are all connected to the gas supply device, and second ends of the plurality of solenoid valves are connected to a plurality of pneumatic drive mechanisms in the flexible suit in one-to-one correspondence manner, that is to say, a number of the plurality of solenoid valves is the same as a number of the plurality of pneumatic drive mechanisms in the flexible suit 710. For example, in the example shown in FIG. 1B, the flexible suit 710 may include 16 pneumatic drive mechanisms, and then the pneumatic control system 720 includes 16 solenoid valves. The control device communicates with the gas supply device and the plurality of solenoid valves.

For example, as shown in FIG. 8, the gas supply device includes a gas source generator and a pneumatic pressure reduction valve connected to each other, and first ends of the plurality of solenoid valves are all connected to the pneumatic pressure reduction valve.

For example, the first ends of the plurality of solenoid valves are also connected to the control device. As shown in FIG. 8, the control device includes a controller and a drive circuit electrically connected to each other, the first ends of the plurality of solenoid valves communicate with the drive circuit, and the pneumatic pressure reduction valve communicates with the controller.

For example, the gas source generator may generate a sufficient gas source body, and the gas source body may be stored within a gas cylinder (not shown in FIG. 8), and the maximum pressure value of the gas source body may be set by the gas source generator, to achieve automatic start-up and stop and replenish the gas source body. The gas source body comes out of the gas source generator, and the maximum pressure entering a pneumatic muscle is controlled by the pneumatic pressure reduction valve. In general, the gas pressure value from the gas source body is higher than the working pressure value of the pneumatic muscle, and therefore, the pneumatic pressure reduction valve is needed to perform decompression treatment. The gas source body subjected to decompression enters the plurality of solenoid valves, and gas source bodies outputted from the plurality of solenoid valves are connected to respective pneumatic muscles in one-to-one correspondence manner via a plurality of gas pipes. Signal input terminals of the plurality of solenoid valves are connected to the drive circuit, the drive circuit receives a control instruction set in advance by the controller, transmits the control instruction to the plurality of solenoid valves through the signal input terminals, and controls the plurality of solenoid valves to perform corresponding opening and closing operations. It may be a case that two 2-position 2-way solenoid valves cooperates to control three states of inflation, deflation and maintenance of one pneumatic muscle, and it may also be a case that one 3-position 3-way solenoid valve controls three states of inflation, deflation and maintenance of one pneumatic muscle. The flexible suit 720 provided by the embodiment of the present disclosure uses a total of 16 pneumatic muscles, there are three pneumatic muscles in each of the left hip joint motion assembly and the right hip joint motion assembly, there are two pneumatic muscles in each of the left knee joint motion assembly and the right knee joint motion assembly, and there are three pneumatic muscles in each of the left ankle joint motion assembly and the right ankle joint motion assembly. The control method for each pneumatic muscle is the same. The gas source body is outputted from a gas source generator via a gap pipe, and then flows into a solenoid valve after passing through a pneumatic pressure reduction valve, and the solenoid valve carries out corresponding opening and closing operations by accepting the control instruction from the drive circuit, so as to control the gas source body to enter into a rubber tube of the pneumatic muscle.

For example, in some embodiments, a specific working process of the flexible suit for rehabilitation training of a human leg is as follows:

When a wearer needs to wear a flexible suit, a flexible braces 1 is put on two shoulders of the wearer, and opening and closing of the flexible suit are implemented with aid of a waist revolute pair 14 at the rear side of the flexible suit, which makes it easy for the wearer to wear. A thigh sheath 6 is tied to the wearer's thigh, a shank sheath 9 is tied to the wearer's shank, and a pedal 13 is tied to the wearer's foot by a flexible bandage and then is placed on pedal brackets 29.

When the wearer has finished the wearing, the pneumatic muscles are pre-inflated, so as to keep legs upright. Then, a rehabilitation training exercise begins. Firstly, as for a first hip joint motion assembly 101 (as shown in FIG. 2), when two pneumatic muscles 4 and 5 at the front end of the first hip joint motion assembly 101 are inflated and shrink, and a pneumatic muscle 3 at the rear end of the first hip joint motion assembly 101 is deflated and stretched, the flexible suit brings the wearer's thigh to raise, so as to achieve a protrusive movement of the wearer's hip joint, and when two pneumatic muscles 4 and 5 at the front end of the first hip joint motion assembly 101 are deflated and stretched, and the pneumatic muscle 3 at the rear end of the first hip joint motion assembly 101 is inflated and shrink, the flexible suit brings the wearer's thigh to put down, so as to achieve a flexion movement of the wearer's hip joint. When the pneumatic muscle 5 at the outer side of the front end of the first hip joint motion assembly 101 is inflated and shrinks, and the pneumatic muscle 4 at the inner side of the front end of the first hip joint motion assembly 101 is deflated and stretched, an abduction movement of the wearer's thigh hip joint can be achieved. When the pneumatic muscle 5 at the outer side of the front end of the first hip joint motion assembly 101 is deflated and stretched, and the pneumatic muscle 4 at the inner side of the front end of the first hip joint motion assembly 101 is inflated and shrinks, an adduction movement of the wearer's thigh hip joint can be achieved. When a three-degrees-of-freedom parallel structure comprising the pneumatic muscle 3, the pneumatic muscle 4 and the pneumatic muscle 5 is subjected to cosine function control with a certain phase offset, complex rotation motions of hip joint can be completed. Thus, the whole leg of the human body can be driven to follow the hip joint to do a better hip joint rehabilitation activity.

As for a first knee joint motion assembly 102 (as shown in FIG. 3), when a pneumatic muscle 8 at the rear end of the first knee joint motion assembly 102 is inflated and shrinks, and a pneumatic muscle 7 at the front end of the first knee joint motion assembly 102 is deflated and stretched, a flexion movement of the wearer's knee joint can be achieved by driving a shank to move. In the process of flexion movement, by controlling the outgassing amount of the pneumatic muscle 7 at the front end of the first knee joint motion assembly 102, the pneumatic muscle 7 loses rigidity, and can be bent following the wearer's knee joint (while a rigid driver is unable to complete this movement form). When a pneumatic muscle 8 at the rear end of the first knee joint motion assembly 102 is deflated and stretched, and a pneumatic muscle 7 at the front end of the first knee joint motion assembly 102 is inflated and shrinks, a protrusive movement of the wearer's knee joint can be achieved by driving the shank to move. Meanwhile, it is ensured that when the pneumatic muscle 7 at the front end of the first knee joint motion assembly 102 shrinks to the shortest position, the wearer's thigh and shank are in an upright state, so that the movement range of the first knee joint motion assembly 102 does not exceed the limit range of movement of the human knee joint. Because the human knee joint is involved in a single-sided movement, and in such a state that a leg stretches out, the leg cannot bend toward the front side of the human body. Thus, the limit range of movement is set, so as to prevent a destructive damage to human legs.

Finally, as for a first ankle joint motion assembly 103 (as shown in FIG. 4), when two pneumatic muscles 11 and 12 at the front end of the first ankle joint motion assembly 103 are inflated and shrinks, and a pneumatic muscle 10 at the rear end of the first ankle joint motion assembly 103 is deflated and stretched, a protrusive movement of the wearer's ankle joint can be implemented, and when the two pneumatic muscles 11 and 12 at the front end of the first ankle joint motion assembly 103 are deflated and stretched, and the pneumatic muscle 10 at the rear end of the first ankle joint motion assembly 103 is inflated and shrinks, a flexion movement of the wearer's ankle joint can be implemented. When the pneumatic muscle 11 at the outer side of the front end of the first ankle joint motion assembly 103 is inflated and shrinks, and the pneumatic muscle 12 at the inner side of the front end of the first ankle joint motion assembly 103 is deflated and stretched, the wearer's foot is driven to move, so as to achieve an abduction movement of the ankle joint. When the pneumatic muscle 11 at the outer side of the front end of the first ankle joint motion assembly 103 is deflated and stretched, and the pneumatic muscle 12 at the inner side of the front end of the first ankle joint motion assembly 103 is inflated and shrinks, the wearer's foot is driven to move, so as to achieve an adduction movement of the ankle joint. When a three-degrees-of-freedom parallel structure comprising the pneumatic muscle 11, pneumatic muscle 12 and pneumatic muscle 13 is subjected to cosine function control with a certain phase offset, complex rotation motions of ankle joint can be completed. Thus, the human feet can be driven to do a better ankle joint rehabilitation activity.

The flexible suit provided by the embodiment of the present disclosure can be used to perform lower limb rehabilitation training exercise for patients with limb injury and patients with muscular atrophy, and can also be used to perform targeted rehabilitation and physiotherapy training on the wearer's hip, knee and ankle joints independently.

In summary, in the flexible suit and the flexible system for rehabilitation training of a human leg provided by the present disclosure, the first hip joint motion assembly, the first knee joint motion assembly and the first ankle joint motion assembly are all connected to a pneumatic control system, the pneumatic control system drives by a pneumatic manner the first hip joint motion assembly, the first knee joint motion assembly and the first ankle joint motion assembly to operate. The manufactured flexible suit has the advantages of a high power density ratio, strong flexibility, good safety and comfort performance, low cost and the like, and also does not cause problems such as being uncomfortable to wear, being harmful to the human body and so on.

In the description of the present disclosure, terms "installation", "join", "connection", "fix" and so on should all be understood in a broad sense. For example, "connection" may be a fixed connection, a detachable connection, or an integral connection; also may be directly connected, or indirectly connected via an intermediate medium. For those ordinarily skilled in the art, the concrete meanings of the above terms in the present disclosure can be understood according to the concrete circumstances.

In the description of this specification, the descriptions of terms "one embodiment", "some embodiments", "specific embodiment", etc., are intended to mean that, specific features, structures, materials or characteristics described in conjunction with the embodiment or example are contained in at least one embodiment or example of the present disclosure. In this specification, the schematic expression of the above terms does not necessarily refer to the same embodiment or example. Furthermore, the specific features, structures, materials, or characteristics described may be combined in an appropriate manner in any one or more of embodiments or examples.

Although embodiments disclosed in the present disclosure are stated above, the described contents are merely the implementations used to facilitate the understanding of the present disclosure, but are not intended to limit the present disclosure. Any technical person skilled in the field of the present disclosure, without departing from the spirit and scope disclosed herein, can make any modification and change in the implementation form and details of the embodiments, but the scope of patent protection of the present disclosure still needs to be the same as the scope defined by the appended claims.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A flexible suit for rehabilitation training of a human leg, comprising: a first hip joint motion assembly, a first knee joint motion assembly and a first ankle joint motion assembly,
wherein a first end of the first knee joint motion assembly is connected with the first hip joint motion assembly, a second end of the first knee joint motion assembly is connected with the first ankle joint motion assembly,
the first hip joint motion assembly, the first knee joint motion assembly, and the first ankle joint motion assembly each comprises a flexible assembly, and the first hip joint motion assembly, the first knee joint motion assembly, and the first ankle joint motion assembly are all configured to operate under gas drive,
the first knee joint motion assembly comprises:
at least two pneumatic drive assemblies respectively located on a first side and a second side of the first knee joint motion assembly,
the at least two pneumatic drive assemblies comprise pneumatic flexible drivers, respectively, and are configured to achieve a contractile movement under the gas drive, and the first side and the second side of the first knee joint motion assembly are two sides opposite to each other.

2. The flexible suit according to claim 1, wherein the first end of the first knee joint motion assembly is hinged with the first hip joint motion assembly, and the second end of the first knee joint motion assembly is hinged with the first ankle joint motion assembly.

3. The flexible suit according to claim 1, wherein the first knee joint motion assembly further comprises:
at least one upper connecting plate and at least one lower connecting plate,
wherein a first end of the at least one lower connecting plate is connected to a second end of the at least one upper connecting plate in one-to-one correspondence manner.

4. The flexible suit according to claim 1, wherein the first knee joint motion assembly further comprises:
two upper connecting plates respectively located on a third side and a fourth side of the first knee joint motion assembly; and
two lower connecting plates respectively located on the third side and the fourth side of the first knee joint motion assembly,
wherein first ends of the two lower connecting plates are connected to second ends of the two upper connecting plates in one-to-one correspondence manner, and the third side and the fourth side of the first knee joint motion assembly are two sides opposite to each other.

5. The flexible suit according to claim 4, wherein the first knee joint motion assembly further comprises:
a thigh sheath, to which first ends of the at least two pneumatic drive assemblies and first ends of the two upper connecting plates are all connected; and
a shank sheath, to which second ends of the at least two pneumatic drive assemblies and second ends of the two lower connecting plates are all connected.

6. The flexible suit according to claim 5, wherein the first ends of the two lower connecting plates are hinged to the second ends of the two upper connecting plates in one-to-one correspondence manner;
the first ends of the at least two pneumatic drive assemblies and the first ends of the two upper connecting plates are all hinged to the thigh sheath; and
the second ends of the at least two pneumatic drive assemblies and the second ends of the two lower connecting plates are all hinged to the shank sheath.

7. The flexible suit according to claim 1, wherein the at least two pneumatic drive assemblies comprise pneumatic muscles, respectively.

8. The flexible suit according to claim 1, wherein the first hip joint motion assembly comprises: at least three pneumatic drive assemblies respectively located on a first side, a second side and a third side of the first hip joint motion assembly,
wherein first ends of the at least three pneumatic drive assemblies are all hinged to the first knee joint motion assembly by first hinge elements,
the at least three pneumatic drive assemblies comprise pneumatic flexible drivers, respectively, and are configured to achieve a contractile movement under the gas drive, the first side of the first hip joint motion assembly and the second side of the first hip joint motion assembly are two sides opposite to each other, and the third side of the first hip joint motion assembly is a side adjacent to both the first side and the second side of the first hip joint motion assembly.

9. The flexible suit according to claim 8, wherein the first hip joint motion assembly further comprises:
a waist sheath, to which second ends of the at least three pneumatic drive assemblies are all hinged by second hinge elements; and
a braces, connected to the waist sheath.

10. The flexible suit according to claim 8, wherein the at least three pneumatic drive assemblies comprise pneumatic muscles, respectively.

11. The flexible suit according to claim 1, wherein the first ankle joint motion assembly comprises: at least three pneumatic drive assemblies respectively located on a first side, a second side and a third side of the first ankle joint motion assembly,
wherein first ends of the at least three pneumatic drive assemblies are all hinged to the first knee joint motion assembly by third hinge elements,
the at least three pneumatic drive assemblies comprise pneumatic flexible drivers, respectively, and are configured to achieve a contractile movement under the gas drive, the first side of the first ankle joint motion assembly and the second side of the first ankle joint motion assembly are two sides opposite to each other, and the third side of the first ankle joint motion assembly is a side adjacent to both the first side and the second side of the first ankle joint motion assembly.

12. The flexible suit according to claim 11, wherein the first ankle joint motion assembly further comprises:
a pedal member, to which second ends of the at least three pneumatic drive assemblies are all hinged by fourth hinge elements.

13. The flexible suit according to claim 11, wherein the at least three pneumatic drive assemblies comprise pneumatic muscles, respectively.

14. The flexible suit according to claim 1, further comprising a second hip joint motion assembly, a second knee joint motion assembly and a second ankle joint motion assembly,
wherein a structure of the first hip joint motion assembly and a structure of the second hip joint motion assembly are identical, a structure of the first knee joint motion assembly and a structure of the second knee joint motion assembly are identical, a structure of the first ankle joint motion assembly and a structure of the second ankle joint motion assembly are identical,
the first knee joint motion assembly and the second knee joint motion assembly are arranged in left-right symmetric manner, the first ankle joint motion assembly and the second ankle joint motion assembly are arranged in left-right symmetric manner, and the first hip joint motion assembly and the second hip joint motion assembly are arranged in left-right symmetric manner.

15. A flexible system, comprising a pneumatic control system and the flexible suit according to claim 1,
wherein the first hip joint motion assembly, the first knee joint motion assembly, and the first ankle joint motion assembly in the flexible suit are all connected to the pneumatic control system, and the pneumatic control system is configured to control, based on the gas drive, at least one of the group consisting of the first hip joint motion assembly, the first knee joint motion assembly, and the first ankle joint motion assembly to operate.

16. The flexible system according to claim 15, wherein the pneumatic control system comprises:
a gas supply device;
a plurality of solenoid valves, wherein first ends of the plurality of solenoid valves are all connected with the gas supply device, and second ends of the plurality of solenoid valves are connected to a plurality of pneumatic drive assemblies in the flexible suit in one-to-one correspondence manner; and a control device, communicating with the gas supply device and the plurality of solenoid valves.

17. The flexible system according to claim 16, wherein the gas supply device comprises a gas source generator and a pneumatic pressure reduction valve connected to each other, and the first ends of the plurality of solenoid valves are all connected to the pneumatic pressure reduction valve.

18. The flexible system according to claim 16, wherein the first ends of the plurality of solenoid valves are also connected with the control device,
the control device comprises a controller and a drive circuit electrically connected to each other, the plurality of solenoid valves communicate with the drive circuit, and the pneumatic pressure reduction valve communicates with the controller.

19. A flexible suit for rehabilitation training of a human leg, comprising: a first hip joint motion assembly, a first knee joint motion assembly and a first ankle joint motion assembly,
wherein a first end of the first knee joint motion assembly is connected with the first hip joint motion assembly, a second end of the first knee joint motion assembly is connected with the first ankle joint motion assembly,
the first hip joint motion assembly, the first knee joint motion assembly, and the first ankle joint motion assembly each comprises a flexible assembly, and the first hip joint motion assembly, the first knee joint motion assembly, and the first ankle joint motion assembly are all configured to operate under gas drive,
the first hip joint motion assembly comprises: at least three pneumatic drive assemblies respectively located on a first side, a second side and a third side of the first hip joint motion assembly,
first ends of the at least three pneumatic drive assemblies are all hinged to the first knee joint motion assembly by first hinge elements,
the at least three pneumatic drive assemblies comprise pneumatic flexible drivers, respectively, and are configured to achieve a contractile movement under the gas drive, the first side of the first hip joint motion assembly and the second side of the first hip joint motion assembly are two sides opposite to each other, and the third side of the first hip joint motion assembly is a side adjacent to both the first side and the second side of the first hip joint motion assembly.

20. A flexible suit for rehabilitation training of a human leg, comprising: a first hip joint motion assembly, a first knee joint motion assembly and a first ankle joint motion assembly,
wherein a first end of the first knee joint motion assembly is connected with the first hip joint motion assembly, a second end of the first knee joint motion assembly is connected with the first ankle joint motion assembly,
the first hip joint motion assembly, the first knee joint motion assembly, and the first ankle joint motion assembly each comprises a flexible assembly, and the first hip joint motion assembly, the first knee joint motion assembly, and the first ankle joint motion assembly are all configured to operate under gas drive,
the first ankle joint motion assembly comprises: at least three pneumatic drive assemblies respectively located on a first side, a second side and a third side of the first ankle joint motion assembly,
first ends of the at least three pneumatic drive assemblies are all hinged to the first knee joint motion assembly by third hinge elements,
the at least three pneumatic drive assemblies comprise pneumatic flexible drivers, respectively, and are configured to achieve a contractile movement under the gas drive, the first side of the first ankle joint motion assembly and the second side of the first ankle joint motion assembly are two sides opposite to each other, and the third side of the first ankle joint motion assembly is a side adjacent to both the first side and the second side of the first ankle joint motion assembly.

\* \* \* \* \*